United States Patent [19]

Milionis

[11] Patent Number: 4,720,299
[45] Date of Patent: Jan. 19, 1988

[54] METHOD FOR THE DIRECT REDUCTION OF PARTICULATE IRON-OXIDE-CONTAINING MATERIAL

[75] Inventor: Konstantin Milionis, Graz, Austria

[73] Assignee: Voest-Alpine Aktiengesellschaft, Austria

[21] Appl. No.: 857,238

[22] Filed: Apr. 29, 1986

[30] Foreign Application Priority Data

May 13, 1985 [AT] Austria .................................. 1441/85

[51] Int. Cl.$^4$ ............................................. C21B 13/02
[52] U.S. Cl. ............................................. 75/34; 75/35
[58] Field of Search ............... 75/34, 35, 91; 252/373; 48/196 R, 196 A

[56] References Cited

U.S. PATENT DOCUMENTS

| | | | |
|---|---|---|---|
| 4,046,557 | 9/1977 | Beggs | 75/34 |
| 4,178,170 | 12/1979 | Iacotti et al. | 75/256 |
| 4,439,233 | 3/1984 | Faccone | 75/91 |
| 4,536,213 | 8/1985 | Sanzenbacher | 75/91 |

Primary Examiner—Melvyn J. Andrews
Attorney, Agent, or Firm—Ostrolenk, Faber, Gerb & Soffen

[57] ABSTRACT

A method for the direct reduction of particulate iron-oxide-containing material. The method is carried out in a shaft furnace, wherein reformed gas from a reformer is fed as reducing gas to a reducing zone of the shaft furnace, the directly reduced ferrous particles are discharged from the shaft furnace and the top gas forming during reduction is extracted from the upper section of the shaft furnace. A hydrocarbon-containing gas is injected into the shaft furnace. Natural gas is separated into a first fraction enriched with low hydrocarbons and a second fraction enriched with higher hydrocarbons. The first fraction is conducted through the reformer and the second fraction is fed into the shaft furnace.

10 Claims, 2 Drawing Figures

METHOD FOR THE DIRECT REDUCTION OF PARTICULATE IRON-OXIDE-CONTAINING MATERIAL

BACKGROUND OF THE INVENTION

1. Field of the Invention:

The invention relates to a method for the direct reduction of particulate iron-oxide-containing material in a shaft furnace. Reformed gas from a reformer is fed as reducing gas to a reducing zone of the shaft furnace. The directly reduced ferrous particles are discharged from the shaft furnace and the top gas forming during reduction is extracted from the upper section of the shaft furnace. A hydrocarbon-containing gas is injected into the shaft furnace, and, if desired, the directly reduced ferrous material (sponge iron) is cooled by means of a cooling gas guided in a recirculating system through the shaft furnace.

2. Description of the Related Art:

Methods of this type have been known for long. The directly reduced ferrous material forming has a carbon content that is not sufficient for further processing into steel. Accordingly attempts have been made to increase the carbon content of the ferrous material (sponge iron) by additional measures.

Thus, is has been proposed according to U.S. Pat. No. 4,054,444 to introduce low hydrocarbons, in particular methane, into the shaft furnace below the reducing zone and to provide for a cooling gas recirculating system in the lower section of the shaft furnace so as to promote the release of carbon according to the Boudouard reaction. However, these measures, according to recent findings, are not always successful in adjusting the carbon content desired in the finished product (sponge iron). In particular, because the cracking temperature of methane is very high and back reactions ("methanization") are likely to occur on account of the reactions in the shaft furnace, even under the consumption of carbon.

SUMMARY OF THE INVENTION

The invention aims at avoiding these disadvantages and difficulties and has as its object to provide a method for the production of directly reduced ferrous material from iron-oxide-containing particles. The carbon content of the end product is adjustable as desired and the composition of the reducing gas leaving the reformer and the reforming reaction, thus being favorably influenced.

The invention consists of separating natural gas into a fraction enriched with low hydrocarbons and a fraction enriched with higher hydrocarbons. The fraction enriched with low hydrocarbons is flowed through the reformer and the fraction enriched with higher hydrocarbons is flowed into the shaft furnace.

By "fraction enriched with low hydrocarbons", a fraction is meant that consists essentially of methane and ethane; as a "fraction enriched with higher hydrocarbons", a fraction is meant that consists essentially of propane, butane and low portions of from pentane to octane.

For instance, natural gas having a composition of 66.7% by mass of methane, 11.0% by mass of ethane, 10.3% by mass of propane, 3.2% by mass of n-butane, 2.7% by mass of i-butane, 0.86% by mass of n-pentane, 1.40% by mass of i-pentane, 0.51% by mass of hexane, 0.60% by mass of heptane, 0.057% by mass of octane, the balance being water, $CO_2$, nitrogen and facultatively benzene and toluene, is separated into a fraction enriched with low hydrocarbons comprising 80.0% by mass of methane, 11.7% by mass of ethane, and 5.1% by mass of propane, and into a fraction enriched with higher hydrocarbons comprising 5.7% by mass of methane, 7.7% by mass of ethane, 34.0% by mass of propane, 18.1% by mass of n-butane, 14.8% by mass of i-butane, 4.8% by mass of n-pentane, 7.8% by mass of i-pentane, 2.9% by mass of hexane, 3.3% by mass of heptane, 0.31% by mass of octane.

In order to separate the natural gas into the two fractions, the known low cooling method is preferred, in which the prescrubbed and predried natural gas is cooled in fractions and fed to a series of separators.

Other known separation methods, such as the compression, adsorption and absorption processes (cf. Ullmanns Encyklopädie der technischen Chemie, Vol. 6, pp. 745 to 750, 3rd Edition, Urban & Schwarzenberg, 1955) may be applied, if desired in a modified and combined manner.

The low-hydrocarbon-enriched fraction is flowed through an indirectly heated reformer in order to produce a reducing gas consisting essentially of hydrogen, carbon monoxide and low portions of carbon dioxide and water.

The separation of the hydrocarbons contained in the natural gas is of great importance to the reforming stage, because the catalyst pipes of the reformer are protected from tar and soot deposits. The deposits occur because higher hydrocarbons are sometimes still contained in the natural gas. In order to remove these deposits, the pipes must be exchanged or cleaned regularly.

According to one embodiment of the method, the fraction enriched with higher hydrocarbons is introduced into the shaft furnace below the reducing zone or into the reducing zone, of the shaft furnace. If this fraction is introduced below the reducing zone, which forms at the height of the blow-in openings (ports or tuyeres) for the reducing gas from the reformer, strong carburization results of the directly reduced ferrous material. This is due to the decomposition of the higher hydrocarbons starting already at low temperatures as compared to methane or ethane and, contrary to methane, being irreversible. If the fraction enriched with higher hydrocarbons is introduced into the reducing zone—for instance, by adding the same to the reducing gas before the latter enters the shaft furnace—, the hydrocarbons react with the oxygen-containing compounds present in the reducing zone, and no or only a slight carburization of the ferrous material is obtained.

According to another suitable embodiment, if a cooling gas recirculating system is provided, the fraction enriched with higher hydrocarbons is fed into the cooling gas recirculating system.

Advantageously, if the method is carried out without a cooling gas recirculating system, the hot-discharged ferrous material (sponge iron) will be briquetted. Also, it is advantageous in many cases if the hot-discharged ferrous material is briquetted with coal dust having a grain size of from 0.2 to 1 mm.

The coal dust is used in an amount of up to 1.5% by mass, preferably in the range of 0.6 to 0.9% by mass, based on the ferrous material. Higher coal admixtures result in a reduced coherence of the briquets.

BRIEF DESCRIPTION OF THE DRAWINGS

The invention will now be explained in more detail by way of the drawing and the following example, wherein.

DETAILED DESCRIPTION OF THE PREFERRED EMBODIMENTS

Figure 1:
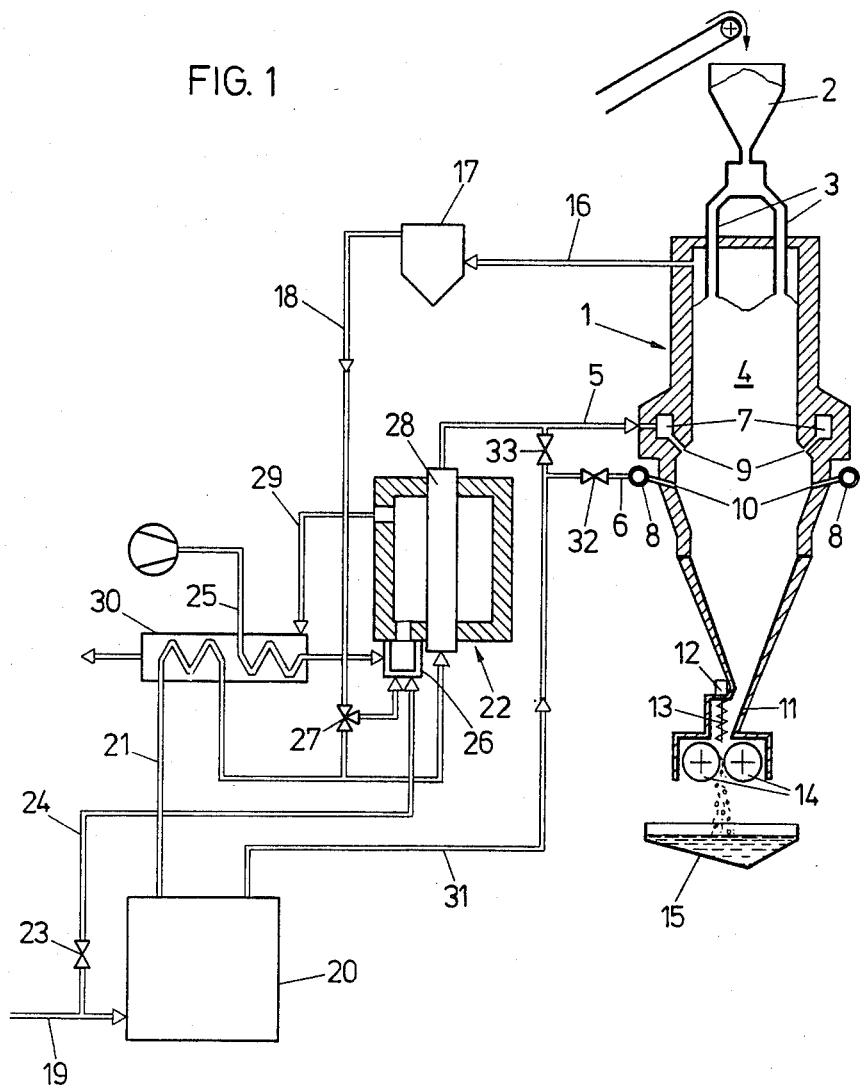
FIG. 1 illustrates a plant for carrying out the method without cooling gas recirculating system, and FIG. 2 schematically illustrates the shaft furnace of such a plant including a cooling gas recirculating system.

A refractory-lined shaft furnace generally denoted by 1 in FIG. 1 is charged with iron ore pellets from a storage container 2 via supply pipes 3. The iron ore pellets supplied form a charging column 4, into which column ducts 5 and 6 enter via annular ducts 7 and 8 as well as via gas ports 9 and 10. The gas ports 9 enter into the reducing zone and the gas ports 10 enter below the reducing zone. On the lower end of the shaft furnace 1, a discharge 11 is provided for the directly reduced ferrous material. Also, in the embodiment illustrated, as a hot stock discharge is designed comprising a pressure worm 13 driven by a motor 12, two briquetting rolls 14, and a cooling bath 15 filled with water to receive the briquets. Coal dust may also be admixed via worm 13.

In the upper section of the shaft furnace 1, an offgas duct 16 for top gas is provided, through which the top gas at first reaches a cooler-scrubber 17. The scrubbed and cooled top gas is carried on through duct 18.

The reducing gas is prepared from natural gas initially supplied to a separation plant 20 through duct 19. In the separation plant 20, the natural gas is separated into a fraction enriched with low hydrocarbons and a fraction enriched with higher hydrocarbons. The fraction that contains a larger portion of low hydrocarbons is fed to a reformer 22 via duct 21. The reformer 22 is indirectly heated, viz., partially by burning top gas from the top gas duct 18 and, if desired, additionally by burning natural gas coming from duct 24, which is equipped with a stop valve 23. Furthermore, an air supply duct 25 to the burner 26 is provided. A three-way valve 27 is incorporated in duct 18 for scrubbed top gas and for injecting the top gas commonly with the low-hydrocarbon-enriched fraction from duct 21 into the catalyst pipes 28 of the reformer 22 (from which just one is illustrated) or feeding it to the burner 26. The hot combustion gases from the reformer 22, in the embodiment illustrated, are supplied, through duct 29, to a recuperator 30. Both the hydrocarbon fraction passing through duct 21 and the air supplied to the burner 26 through duct 25 may be preheated by heat exchange in recuperator 30. The reducing gas leaving the reformer 22 is fed into the annular duct 7 of the shaft furnace through supply duct 5.

If a stronger carburization of the directly reduced ferrous material is desired, the fraction enriched with higher hydrocarbons coming from the separation plant 20, through duct 31 via stop valves 32 and 33, is supplied to supply duct 6. If no or only a slight carburization is required this fraction is supplied to supply duct 5.

Figure 2:
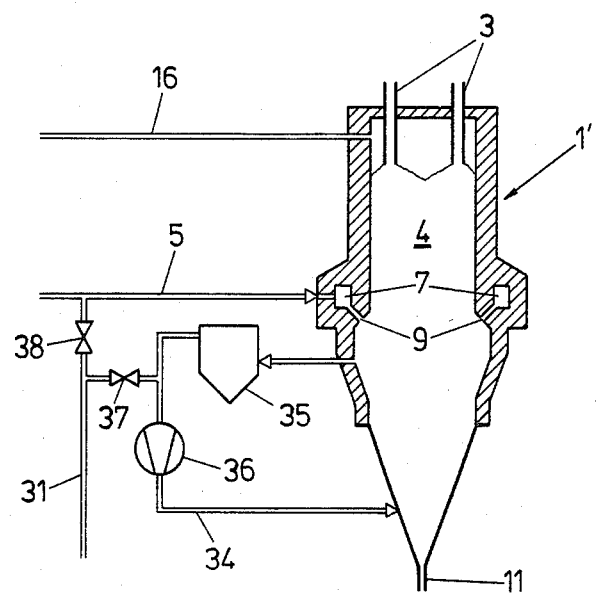

In FIG. 2, only part of the plant is illustrated, i.e., a shaft furnace 1' including a cooling gas recirculating system 34, analogous apparatus parts have identical reference numerals. A scrubber-cooler 35 and a compressor 36 are incorporated in the cooling gas recirculating system. If such a cooling gas recirculating system 34 is provided, the fraction enriched with higher hydrocarbons is fed directly into the cooling gas recirculating system from duct 31 via a valve 37.

However, it is also possible to feed the fraction from duct 31 at least partially into duct 5 via a valve 38.

In each of the two cases described above in connection with FIG. 2, the reduced ferrous material is cold-discharged.

EXAMPLE

Natural gas is supplied to the separation plant 20 in an amount of 20,000 m³ under normal conditions (Nm³)/h, with 18,800 Nm³/h of fraction enriched with low hydrocarbons and 1,200 Nm³/h of fraction enriched with higher hydrocarbons being obtained. The low-hydrocarbon-enriched fraction (I) consists essentially of methane and ethane. The higher-hydrocarbon-enriched fraction (II) primarily contains propane, butane and higher hydrocarbons.

Fraction I is conducted through the catalyst pipes 28 of the reformer 22. The resulting reducing gas leaves the reformer at a temperature of 950° C. and is introduced into the shaft furnace 1 through supply duct 5. A reducing zone is formed at the height of the gas ports 9, The reduction of the iron-oxide-containing material takes place for the major part at this location. Fraction II is completely introduced into the shaft furnace below the reducing zone through supply duct 6.

The highly metallized sponge iron product hot-discharged from the shaft furnace 1 incurs in an amount of 80 t/h, and having a carbon content of 3.2%. A sponge iron product with a carbon content of no more than 1.07% would result without introduction of fraction II into the shaft furnace.

Another embodiment of the invention, consists of adding carbon yielding material, such as higher hydrocarbons liquid under normal conditions, tar, bitumen or coal dust, below the reducing zone, i.e., in the lower section of the shaft furnace, if necessary by means of a carrier gas. This method achieves an increase in the carbon portion of directly reduced ferrous material using a plant of the present invention whose carbonaceous constituents do not suffice to reach the desired higher carbon content in the end product (sponge iron).

What is claimed is:

1. A method for the direct reduction of particulate iron-oxide-containing material in a shaft furnace including an upper section, a reducing zone and a lower section arranged below said reducing zone, which method comprises:

charging said particulate iron-oxide-containing material into said shaft furnace;

supplying reformed gas from a reformer as reducing gas to said reducing zone of said shaft furnace so as to obtain directly reduced ferrous particles and top gas;

discharging said directly reduced ferrous particles from said shaft furnace;

extracting said top gas from said upper section of said shaft furnace;

separating natural gas containing low hydrocarbons of methane and ethane, and higher hydrocarbons of propane, butane, and hydrocarbons from pentane to octane into a first fraction enriched with said low hydrocarbons and a second fraction enriched with said higher hydrocarbons, before introducing said fractions into said shaft furnace and said reformer;

conducting said first fraction through said reformer to form said reformed gas; and injecting said second fraction into said shaft furnace.

2. A method as set forth in claim 1, further comprising conducting a cooling gas recirculating system through said shaft furnace and cooling said directly reduced ferrous material by said cooling gas recirculating system.

3. A method as set forth in claim 1, wherein said second fraction is introduced into said shaft furnace below said reducing zone or into said reducing zone.

4. A method as set forth in claim 2, wherein said second fraction is fed into said cooling gas recirculating system.

5. A method as set forth in claim 1, wherein said ferrous material being hot-discharged is briquetted.

6. A method as set forth in claim 5, wherein said ferrous material being hot-discharged is briquetted commonly with coal dust having a grain size of from 0.2 to 1 mm.

7. A method as set forth in claim 6, wherein said coal dust is used in an amount of up to 1.5% by mass, based on said ferrous material.

8. A method as set forth in claim 7, wherein said amount ranges between 0.6 and 0.9% by mass.

9. A method as set forth in claim 1, further comprising introducing into said lower section of said shaft furnace additional carbon yielding material selected from the group consisting of higher hydrocarbons liquid under normal conditions, tar, bitumen and coal dust, so as to adjust a desired carbon content in said directly reduced particulate ferrous material.

10. A method as set forth in claim 9, wherein said additional carbon yielding material is introduced by a carrier gas.

* * * * *